United States Patent Office 3,052,645
Patented Sept. 4, 1962

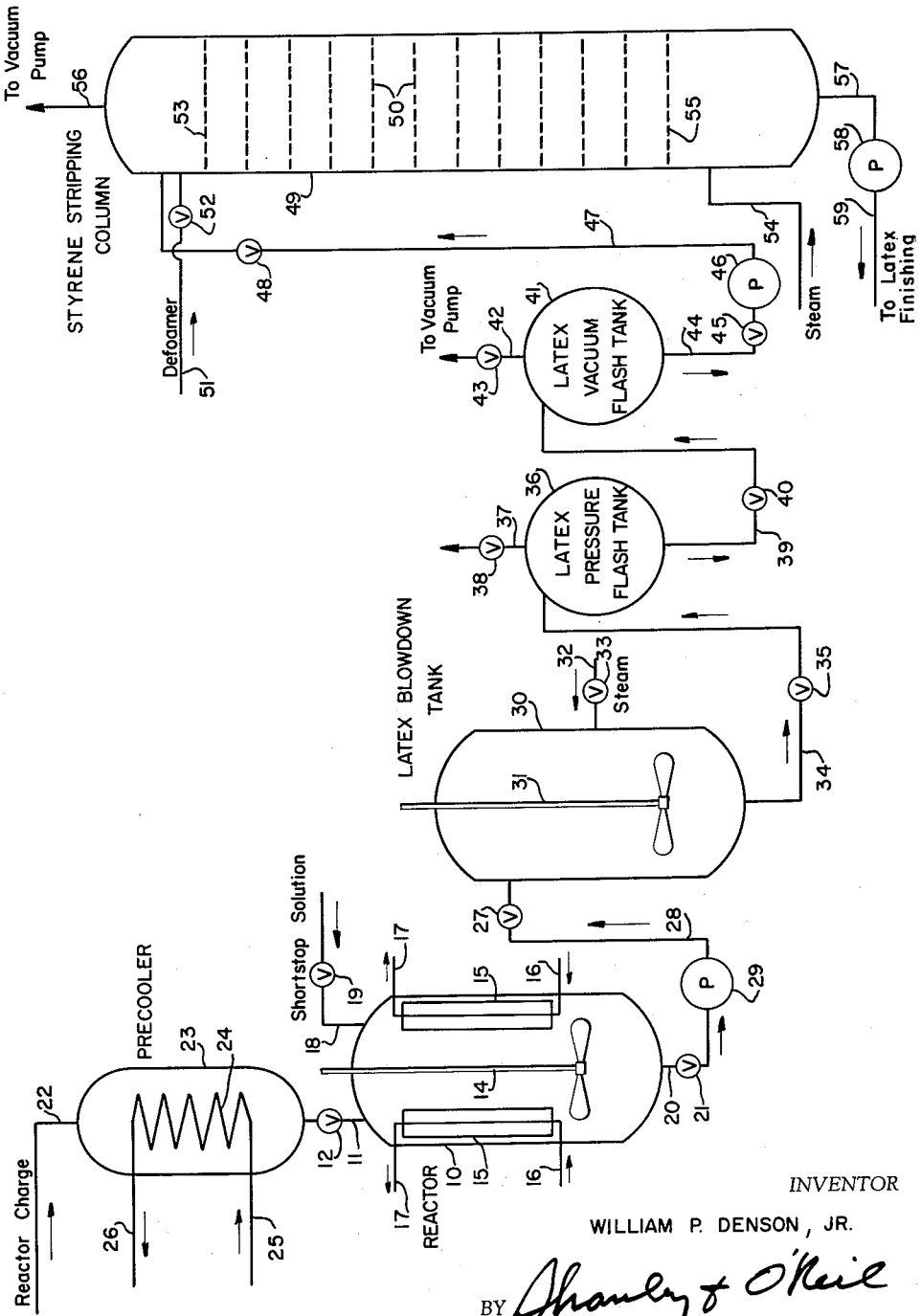

3,052,645
PROCESS FOR SEPARATING UNREACTED PO-
LYMERIZABLE MATERIAL FROM DIENE POLY-
MER LATEX IN THE PRESENCE OF A LONG
CHAIN ALIPHATIC ALCOHOL
William P. Denson, Jr., Baton Rouge, La., assignor to
Copolymer Rubber and Chemical Corporation, a corporation of Louisiana
Filed Dec. 31, 1957, Ser. No. 706,512
16 Claims. (Cl. 260—29.7)

This invention broadly relates to the preparation and processing of synthetic rubber latices, and more particularly to a process for reducing prefloc formation during a monomer recovery step in the preparation and processing of synthetic rubber latices.

Synthetic rubber latices may be prepared by processes well known in the art such as, for example, prior art processes wherein polymerizable material is emulsified in an aqueous medium by means of an emulsifying agent such as a fatty acid soap or other suitable surface active agent, and then polymerized under suitable controlled reaction conditions in the presence of a catalyst and other regulating materials. The polymerization is generally "short-stopped" at a suitable stage before complete conversion of the monomer or monomers to polymer such as, for example, at about 60% conversion, and the unreacted monomer or monomers separated from the resulting unstripped latex by flashing and/or steam distillation. The stripped synthetic rubber latices so prepared may be concentrated to produce a commercial high solids synthetic rubber latex product, or coagulated by means of a suitable coagulant to produce solid synthetic rubber.

In an aqueous emulsion polymerization process for the preparation of synthetic rubber latex wherein the polymerization is short-stopped at a suitable stage before complete conversion of the monomeric material to polymer, when the synthetic rubber latex leaves the reactor considerable amounts of unreacted monomer or monomers are present in the swollen polymer particles of the latex. It is generally considered in the art that particles of polymer in the unstripped synthetic rubber latex are encompassed by a thin film of emulsifier which stabilizes and protects the polymer particles, and that a large proportion of the unreacted monomer or monomers present in the latex is absorbed, dissolved in, or otherwise present within the swollen polymer particles. Thus, during a subsequent monomer recovery step following polymerization, the monomer or monomers present within the polymer particles must be withdrawn therefrom before recovery of unreacted monomeric material may be effected. This results in rupture of the encompassing protective film of emulsifier and the surfaces or at least a portion of the surfaces of the individual polymer particles are exposed and unprotected by the film of emulsifier. It is thought that such exposed and unprotected surfaces of two or more polymer particles are much more likely to fuse, thereby forming larger unstable polymer particles and resulting in prefloc formation. As is well understood in the art, prefloc formation lowers the yield of product and necessitates frequent cleaning of processing apparatus, thereby rendering the operation less economic.

Prefloc formation in prior art processes for the preparation and processing of synthetic rubber latices has been a long-standing problem. It is particularly difficult to control during a monomer recovery step due to rupture of the protective emulsifier film upon release of the monomeric material from the polymer particles, and the control of prefloc formation caused thereby has met with no success prior to the present invention. As a result, the art has long sought a suitable process for substantially reducing the relatively large amounts of prefloc which tend to form during a monomer separation step in prior art processes for the preparation and processing of synthetic rubber latices.

It is an important feature of the present discovery that prefloc formation may be greatly reduced during separation of unreacted monomeric material from unstripped synthetic rubber latex by separating unreacted monomer from the latex in the presence of a dispersion of a higher aliphatic alcohol having a carbon chain of about 14–25 carbon atoms. In general, the preparation and processing of a given synthetic rubber latex in accordance with the present invention may follow prior art practice with the exception of carrying out a monomer recovery step in the presence of the dispersion of higher aliphatic alcohol. Synthetic rubber latex prepared and processed in accordance with the present invention is characterized by improved mechanical stability and thus it is a more desirable product. Further, the presence of the higher aliphatic alcohol does not adversely affect the latex in any manner and it may be subsequently processed by a suitable conventional process for the preparation of a desired commercial product such as high solids synthetic rubber latex, or solid synthetic rubber.

It is still a further feature of the present discovery that the mechanical stability of synthetic rubber latex may be improved by incorporating therewith a dispersion of a higher aliphatic alcohol having a carbon chain of about 14–25 carbon atoms, and that the resulting synthetic rubber latex characterized by improved stability is likewise a more desirable product.

It is an object of the present invention to provide an improved process for the preparation and processing of synthetic rubber latex.

It is a further object of the present invention to provide an improved process for separating an unreacted monomeric material from synthetic rubber latex whereby prefloc formation is reduced.

It is still a further object of the present invention to provide a novel process for improving the stability of synthetic rubber latex.

It is still a further object of the present invention to provide synthetic rubber latex characterized by improved stability.

Still other objects of the present invention and the advantages thereof will be apparent to those skilled in the art by reference to the following detailed description and the drawings, which diagrammatically illustrate one suitable arrangement of apparatus for preparing butadiene-styrene synthetic rubber latex and separating an unreacted monomer therefrom in accordance with the present invention.

Referring now to the drawings, reactor 10 is a pressure vessel suitable for use in polymerizing butadiene and styrene to form synthetic rubber latex by an aqueous emulsion polymerization process. The reactor 10 may be provided with an inlet conduit 11 including normally closed control valve 12 for charging reactants and other ingredients comprising a prior art recipe for GR-S synthetic rubber latex, and agitator 14 which is constructed and arranged so as to assure adequate agitation of the contents, conventional means for controlling the polymerization temperature which may include tube bundles 15 and conduits 16 and 17 for supplying to and withdrawing from, respectively, a controlled quantity of liquefied ammonia or other suitable coolant to maintain a desired polymerization temperature, conduit 18 including normally closed control valve 19 for supplying short-stop solution to the contents when the desired percent conversion of monomers to polymer is reached and thereby terminate the polymerization, and outlet conduit 20 including normally closed control valve 21 for withdrawing prepared unstripped synthetic rubber latex. When charging reactor 10, valve 12 in conduit 11 is opened and the reactants and other ingredients comprising a prior art GR–S recipe including butadiene, styrene, soap solution, water, initiators or catalysts and regulators or modifiers may be charged to reactor 10 in the usual sequence and desired quantities through conduit 22, precooler 23 and conduit 11. If desired, all of the ingredients of a prior art GR–S recipe, except the catalyst solution and a portion of the water, may be charged simultaneously to reactor 10 while the agitator 14 is in operation. Then, the catalyst solution may be charged to reactor 10 followed by the remaining water. In addition, as will be discussed more fully hereinafter, the soap solution component of the GR–S recipe charged to reactor 10 may contain a higher aliphatic alcohol having a carbon chain of about 14–25 carbon atoms dispersed therein, or an aqueous dispersion of the alcohol may be separately or simultaneously charged to reactor 10. A suitable coolant such as cold water at about 33° F. may be supplied to and withdrawn from cooling coil 24 in precooler 23 via conduits 25 and 26, respectively, for the purpose of precooling the reactants and other ingredients charged to reactor 10 to a desired temperature, preferably to a temperature in the vicinity of the polymerization temperature such as about 40–45° F., and thereby reduce the initial thermal load on the temperature control means which may be provided for reactor 10.

After charging reactor 10, valve 12 in conduit 11 is closed and the polymerization may be allowed to proceed with agitation of the reactor contents and while closely controlling the polymerization temperature, preferably at a temperature of about 41° F., until the desired percent conversion of monomers to polymer is reached. The initial reactor pressure of about 10 p.s.i.g. decreases somewhat as the polymerization proceeds due to reaction of a portion of the butadiene. At a suitable stage, e.g., when about 60% by weight of the total weight of butadiene and styrene charged to reactor 10 is converted to polymer, the ploymerization is terminated, i.e., "short-stopped" by opening valve 19 and supplying via conduit 18 an aqueous solution of sodium dimethyldithiocarbamate and sodium polysulfide or other suitable short-stop solution to the contents of reactor 10. The short-stop solution is blended with the unstripped GR–S synthetic rubber latex contents of reactor 10 and then valves 21 and 27 in conduits 20 and 28, respectively, are opened and the unstripped latex is transferred by means of pump 29 via conduits 20 and 28 from reactor 10 to latex blowdown tank 30. The valve 27 in conduit 28 is closed after transfer of the unstripped latex.

The latex blowdown tank 30 may be provided with a suitably arranged agitator 31 for agitating the contents, conduit 32 including control valve 33 for supplying desuperheated steam, and conduit 34 including control valve 35 for withdrawing the contents. If desired, means also may be provided for recovering a portion of the unreacted butadiene content of the unstripped latex. While the unstripped latex containing as unreacted monomers about 40% by weight of the total weight of butadiene and styrene charged to reactor 10 is within latex blowdown tank 30, it may be warmed with agitation to a suitable temperature such as 120° F. by means of desuperheated steam supplied via conduit 32 and opened valve 33 at a pressure of 60 p.s.i.g. or other suitable pressure. Warming of the latex in this manner results in a pressure such as about 40 p.s.i.g. within latex blowdown tank 30 and, since the pressure within latex pressure flash tank 36 is maintained at an appreciably lower pressure, upon opening valve 35 the unstripped latex may be transferred at a desired flow rate by differential pressure from latex blowdown tank 30 via conduit 34 to latex pressure flash tank 36.

The latex pressure flash tank 36 is provided with conduit 37 including control valve 38 for withdrawing vaporized butadiene, and conduit 39 including control valve 40 for withdrawing partially stripped latex. A suitable pressure slightly above atmospheric pressure, such as 2 p.s.i.g., is maintained within latex pressure flash tank 36. Under the prevailing temperature and pressure conditions, a major proportion of the unreacted butadiene content of the unstripped latex is vaporized and removed via conduit 37 upon opening control valve 38. The butadiene vapors thus removed may be liquefied and recycled for charging to reactor 10, if desired.

After a sufficient residence time in latex pressure flash tank 36 to remove a major proportion of the unreacted butadiene, the latex is withdrawn via conduit 39 upon opening valve 40 and passed at a desired flow rate to latex vacuum flash tank 41. Inasmuch as latex vacuum flash tank 41 is maintained at a suitable reduced pressure such as about 188 mm./Hg absolute by means of a vacuum maintained on conduit 42 including opened control valve 43, the latex may be transferred by differential pressure and without the need for pumping means. During residence within latex vacuum flash tank 41, all but very small amounts of the remaining unreacted butadiene content of the latex is vaporized and the vapors removed via conduit 42. The additional unreacted butadiene vapors thus separated may be liquefied and recycled for charging to reactor 10, if desired. The temperature of the latex is lowered somewhat largely due to vaporization of the unreacted butadiene content as it is passed through latex pressure and vacuum flash tanks 36 and 41. For example, when the temperature of the latex feed to latex pressure flash tank 36 is about 120 F., then the temperature of the latex upon withdrawal from vacuum flash tank 41 generally is in the vicinity of about 90° F. The partially stripped latex containing only relatively small or trace amounts of the original unreacted butadiene content and substantially all of the unreacted styrene is withdrawn from latex vacuum flash tank 41 via conduit 44 upon opening valve 45. The latex is then pumped by means of pump 46 via conduit 47 upon opening valve 48 to the upper portion of styrene stripping column 49 at a controlled feed rate such as about 70–80 g.p.m.

The styrene stripping column 49 may be of a conventional "Standard Government Plant" design and provided with a plurality of suitably arranged perforated trays 50, a conduit 51 including control valve 52 for feeding defoamer to upper tray 53, and conduit 54 for supplying desuperheated steam to the lower portion of the column such as below lower tray 55. The styrene stripping column 49 is operated under a suitable reduced pressure such as approximately 88 mm./Hg absolute by means of a vacuum maintained on conduit 56. The partially stripped latex feed entering at upper tray 53 passes downward through styrene stripping column 49 in countercurrent relationship with desuperheated steam supplied via conduit 54, the perforated trays 50 assuring intimate contact therewith. Simultaneously, methyl silicone defoamer, such as Dow-Corning Anti-foam A or other suitable defoamer, is fed to upper tray 53 via conduit 51 and opened control valve 52 for the purpose of suppressing foaming and preventing operational problems arising from foaming of the latex. The styrene stripping column 49 may be operated at a temperature varying from about 120–130°

F. at the top of the column to about 140–165° F. at the bottom of the column, with the pressure at any given point in the column being in equilibrium with the temperature. As the partially stripped latex feed passes downward through styrene stripping column 49, the remaining traces of unreacted butadiene and the unreacted styrene content is separated by vaporization, i.e., steam distillation, and the resulting butadiene and styrene vapors together with the steam content are withdrawn via conduit 56. If desired, the butadiene and styrene content may be recovered from the withdrawn vapors for recycle to reactor 10.

The resulting stripped GR–S latex containing substantially no unreacted butadiene and only very small or trace amounts of styrene is withdrawn from styrene stripping column 49 via conduit 57 and, if desired, forced by means of pump 58 via conduit 59 to a subsequent latex finishing operation. For example, the resulting stripped latex may be concentrated to a commercial high solids synthetic rubber latex product by a conventional process, or the latex may be coagulated by a concentional process to produce solid GR–S rubber, or other finishing treatments may be performed such as are conventional in the art.

As previously mentioned, in accordance with one embodiment of the invention prefloc formation during separation of unreacted monomeric material from unstripped synthetic rubber latex is reduced by separating at least a portion of the unreacted monomeric material from the latex in the presence of a higher aliphatic alcohol having a carbon chain of about 14–25 carbon atoms. For better results, the alcohol should be present in the latex throughout the unreacted monomer separation step or steps. In view of this, when GR–S synthetic rubber latex is prepared by the process illustrated and described herein, the alcohol should be present in the latex at least by the time of its entry into latex pressure flash tank 36. Preferably, the alcohol is dispersed in the soap solution charged to reactor 10. However, good results also may be obtained by dispersing the alcohol in water containing a surface active agent which does not adversely affect the latex such as a suitable fatty acid soap and/or alkyl aryl sulfonate, and blending the dispersion with the latex at any suitable point after the polymerization step and prior to separating an unreacted monomer. For example, such an aqueous dispersion of the alcohol may be added to reactor 10 at any convenient time, such as with the shortstop solution, to latex blowdown tank 30, or in any of conduits 20, 28 and 34, provided the dispersion is blended with the latex prior to separation of an unreacted monomer.

In general, any suitable higher aliphatic alcohol having a carbon chain of about 14–25 carbon atoms may be used in practicing the present invention. However, better results are usually obtained when using a suitable higher aliphatic alcohol having a carbon chain of about 16–18 carbon atoms. Cetyl alcohol, stearyl alcohol and mixtures thereof have been found to give highly satisfactory results and are preferred in most instances. The amount of alcohol present in the latex in practicing the invention may vary over a considerable range. About 0.001 part by weight of dispersed alcohol for each 100 parts by weight of latex solids will generally result in an appreciable improvement in reducing prefloc formation during separation of an unreacted monomer or in improving the stability of synthetic rubber latex, but amounts much larger than this may be used since the upper limit appears to be largely economic in nature. For example, about 0.001–2.0 parts by weight of dispersed alcohol for each 100 parts by weight of latex solids give very satisfactory results. About 0.005–0.5 part by weight of dispersed alcohol for each 100 parts by weight of latex solids generally gives even better results and is preferred. The amount of the alcohol present in or added to the latex is based upon each 100 parts by weight of latex solids. In the specification and claims, when determining the weight of latex solids for the purpose of arriving at the amount of the alcohol present in or added to the latex, the weight of latex solids is defined as the weight of the polymer, soap and other non-volatile substances which are present in the latex.

The higher aliphatic alcohols having a carbon chain of 14–25 carbon atoms are solids which are substantially insoluble in an aqueous medium. In view of this, the alcohol is thought to be present in the latex largely in the form of a dispersion which in some way modifies the emulsifier film encompassing the individual polymer particles of the latex to thereby result in greater protection and improved "diffusion-stability" of the latex during a monomer recovery step.

The dispersion of alcohol may be prepared in any suitable manner. For example, the normally solid alcohol may be reduced to a finely divided state and added with agitation to water containing a surface active agent such as a suitable fatty acid soap and/or alkyl aryl sulfonate which does not adversely affect the latex. The concentration of alcohol in the prepared dispersion to be added to latex is not generally of importance, but usually a 0.5% dispersion is preferred for practical reasons. Warming of the water to about 170° F. often facilitates preparation of the dispersion and this may be desirable in some instances. Once the dispersion is prepared, it then may be added to and blended with the latex at any suitable desired time. It also may be possible under certain conditions to prepare the dispersion of alcohol directly in the unstripped latex, but this is not generally desirable for practical reasons.

In general, it is not necessary to change the operating conditions or variables which are conventionally used in the preparation of a given synthetic rubber latex in order to prepare and process a synthetic rubber latex in accordance with the present invention other than by providing for the presence of the alcohol in the latex at the time of monomer recovery. In all other respects, conventional practice usually may remain substantially the same.

While the preparation of a butadiene-styrene synthetic rubber latex and the separation of unreacted monomers therefrom in accordance with the present invention has been specifically illustrated herein, it is understood that the present invention is not limited thereto. Examples of polymerizable material which may be used in preparing synthetic rubber latices containing an unreacted monomer which may be separated therefrom in accordance with the invention are the various 1,3-butadienes such as 1,3-butadiene, 2-methyl-1,3-butadiene, 2-chloro-1,3-butadiene, 2,3-dimethyl-1,3-butadiene and piperylene. If desired, the polymerizable material may be a mixture of a 1,3-butadiene, such as 1,3-butadiene, with another polymerizable compound which is capable of forming rubbery copolymers with 1,3-butadienes. For example, such polymerizable mixtures may contain up to 50% (or higher in some instances) of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with 1,3-butadienes are the aryl olefins, such as styrene, alpha methyl styrene, and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene, methyl vinyl ether; and methyl vinyl ketone. The preferred polymerizable material for many commercial applications is a mixture of butadiene and styrene wherein the styrene content of the mixture, by weight, is less than about 70%. A typical recipe in parts by weight for preparing a butadiene-styrene synthetic rubber latex is given below in Table I. Typical recipes and the manner of preparing other types of synthetic rubber latices are well known and readily available to the art.

TABLE I

| Ingredient: | Parts by weight |
|---|---|
| Butadiene | 100–30 |
| Styrene | 0–70 |
| Potassium or sodium oleate | 1.5–5.0 |
| Electrolyte [1] | 0.2–1.5 |
| Secondary emulsifier [2] | 0–1.5 |
| Ethylenediamine tetra-acetic acid tetra-sodium salt [3] | [4] 0–0.10 |
| Sodium hydrosulfite | 0–0.10 |
| Water | 150–250 |
| Sodium formaldehyde sulfoxylate | 0.04–0.20 |
| Di-isopropylbenzene hydroperoxide or paramenthane hydroperoxide | 0.05–0.30 |
| Tertiarydodecylmercaptan | 0–0.3 |
| Ferrous sulfate heptahydrate | 0.02–0.04 |
| Versene 100 (to complex ferrous sulfate) | 0.03–0.06 |
| Short-stop (aqueous solution of sodium dimethyldithiocarbamate and sodium polysulfide) | .05–0.20 |

[1] The following electrolytes or mixtures of any two may be used: potassium chloride, sodium chloride, trisodium phosphate, tripotassium phosphate, potassium pyrophosphate, potassium sulfate, sodium sulfate, sodium borate and lithium chloride.
[2] Tamol N, Daxad 11, Nycol (polymerized sodium salts of alkyl naphthalene sulfonic acid).
[3] Sold as Versene 100, a product of Dow Chemical Co.; Sequestrene 30–A, a product of Alrose Chemical Co.; Nullapon BF–13, a product of Antara Chemicals.
[4] In soap solution.

The process of the present invention is most effective in reducing prefloc formation during the separation of an unreacted normally gaseous monomer, such as butadiene, from synthetic rubber latex. Inasmuch as considerably greater amounts of prefloc are generally formed during separation of normally gaseous monomers than are formed during separation of normally liquid monomers such as styrene, it may be seen that the present invention is very useful when used only in separating an unreacted normally gaseous monomer. However, better results are obtained in terms of the total reduction in prefloc formation when the dispersion of alcohol is present in the latex throughout the monomer recovery step or steps. In addition, it is preferred that the dispersion of alcohol be present in the latex throughout both the polymerization and monomer recovery step or steps since a still greater over-all reduction in prefloc formation may be realized in some instances due to reduction of prefloc formation during the polymerization step.

In accordance with another embodiment of the invention, the mechanical stability of synthetic rubber latex is improved by incorporating a dispersion of the alcohol therein. The resulting synthetic rubber latex is characterized by substantially improved mechanical stability. In addition, a synthetic rubber latex prepared and processed in accordance with the present invention is characterized by improved mechanical stability.

The foregoing detailed discussion and the following specific examples are for the purpose of illustration only, and are not intended as being limiting to the spirit or scope of the appended claims.

Example I

"Cold rubber" GR–S latex batches were prepared following conventional procedure and under conventional "cold rubber" reaction conditions in experimental one-half gallon reactors using the following recipe.

| Ingredient: | Parts by weight |
|---|---|
| Water | 200 |
| Butadiene | 70 |
| Styrene | 30 |
| Emulsifier (fatty acid soap) | 4.5 |
| Secondary emulsifier (alkyl aryl sulfonate) | 0.15 |
| Electrolyte (tri-sodium phosphate) | 0.5 |
| Ferrous sulfate | 0.018 |
| Chelating agent (ethylenediamine tetra-acetic acid tetra-sodium salt) | 0.027 |
| Sodium formaldehyde sulfoxylate | 0.07 |
| Hydroperoxide (paramenthane hydroperoxide, diisopropylbenzene monohydroperoxide) | 0.06 |
| Sulfole as a modifier (technical tertdodecyl mercaptan) | 0.18 |

The polymerization was short-stopped at 60% conversion by adding a solution containing about 0.10 part by weight of sodium dimethyldithiocarbamate and sodium polysulfide, and the unreacted butadiene content separated by venting the reactors.

For the purpose of illustrating the effect of a higher aliphatic alcohol containing 14–25 carbon atoms on prefloc formation during separation of the unreacted butadiene content, stearyl alcohol in the form of an aqueous dispersion was added to all but one of the batches of latex. One batch of latex was prepared without addition of stearyl alcohol as a control. Quantitative prefloc formation tests were run on each of the various batches immediately after the polymerization step and after venting the reactors to recover unreacted butadiene. The following data illustrate results obtained, with all parts being by weight and based on the total weight of butadiene and styrene charged to the reactor:

| Parts Stearyl Alcohol | Added | Reaction Time (hours) | Percent Prefloc | | |
|---|---|---|---|---|---|
| | | | Reaction | Venting | Total |
| 0.0 (control) | | 6.2 | 0.28 | 0.36 | 0.64 |
| 0.8 | (in short-stop solution.) | 6.3 | 0.27 | 0.10 | 0.37 |

The above data show that the presence of stearyl alcohol in the latex greatly reduces prefloc formation during venting of unreacted butadiene.

Example II

Several batches of GR–S latex were prepared following conventional procedures and under conventional "cold rubber" reaction conditions using the equipment illustrated in the drawings and described herein. The recipe was the same as that of Example I. The unreacted butadiene content was then separated in the pressure and vacuum flash tanks after short-stopping the reaction at 60% conversion. Quantitative prefloc formation tests were run on each of the various batches following separation of unreacted butadiene.

The recipe, reaction conditions, and butadiene separation conditions were the same for all of the latex batches with the exception of adding an aqueous dispersion of cetyl-stearyl alcohol (about a 50–50 mixture) in the soap solution charged to all reactors, with the exception of one reactor charge which was used as a control.

The following data illustrate results obtained with all parts being by weight and based on the total weight of butadiene and styrene charged to the reactors.

| Parts cetyl-stearyl alcohol: | Percent prefloc |
|---|---|
| 0.0 (control) | 0.95 |
| 0.0013 | 0.51 |
| 0.0058 | 0.35 |

The above data show that the addition of an aqueous dispersion of cetyl-stearyl alcohol in the soap solution charged to the reactors results in a marked reduction in prefloc formation during separation of an unreacted monomer.

Example III

This example illustrates the use of higher aliphatic alcohols having a carbon chain of $C_{14}$–$C_{25}$ carbon atoms for improving the stability of conventional stripped synthetic rubber latices.

Mechanical instability tests were run on various conventional butadiene-styrene synthetic rubber latices, both with and without addition of varying amounts of an aqueous dispersion of higher aliphatic alcohol. The mechanical instability test comprised the quantitative determination of the amount of prefloc formed from 200 ml. of latex subjected to vigorous agitation for 5 minutes. The test was run in a high speed (16,000 r.p.m.) Hamilton Beach malted milk mixer (Model No. 33). The results for mechanical instability were recorded as grams of prefloc formed during the period of agitation for each 100 grams of latex solids present in the agitated sample.

A series of mechanical instability tests were conducted on Copo 800L latex (a conventional 50/50 butadiene/styrene latex emulsified with a faty acid soap). The data obtained were as follows.

Parts cetyl-stearyl alcohol
per 100 parts polymer: Mechanical instability
0.0 (control) ------------------------------- 0.62
0.0325 ---------------------------------- 0.32
0.0650 ---------------------------------- 0.24
0.0975 ---------------------------------- 0.21
0.325 ----------------------------------- 0.08

A series of mechanical instability tests conducted on a paint-type latex which generally exhibits extremely poor stability characteristics gave the following results.

Parts cetyl-stearyl alcohol
per 100 parts polymer: Mechanical instability
0.0 (control) ------------------------------- 32.00
0.0325 ---------------------------------- 2.40
0.0650 ---------------------------------- 0.82

A series of mechanical instability tests conducted on several conventional butadiene-styrene latices gave the following results:

| Parts Cetyl-Stearyl Alcohol per 100 Parts Polymer | Mechanical Instability | | | |
|---|---|---|---|---|
| | Copo 1500 | Copo 1502 | Copo 1505 | Copo 1712 |
| 0.0 | 0.51 | 0.50 | 0.010 | 0.013 |
| 0.065 | 0.16 | 0.02 | 0.004 | 0.004 |

A series of mechanical instability tests were conducted using Copo 800L latex and commercial stearyl alcohol and cetyl-stearyl alcohol mixtures (Adol 63 and Adol 66, cetyl-stearyl alcohol mixtures marketed by Archer-Daniels-Midland Company). The following results were obtained:

| Parts Alcohol per 100 Parts Polymer | Mechanical Instability | | |
|---|---|---|---|
| | Stearyl alcohol | Adol 63 | Adol 66 |
| 0.0 (control) | 0.68 | 0.68 | 0.68 |
| 0.03 | 0.25 | 0.30 | 0.50 |
| 0.06 | 0.15 | 0.20 | 0.13 |
| 0.09 | 0.10 | 0.13 | 0.08 |
| 0.12 | 0.08 | 0.08 | 0.08 |

The higher aliphatic alcohols described herein may be added to latex in relatively large amounts without adverse effect, as illustrated by the following data for Copo-800L latex.

Parts cetyl-stearyl
alcohol per 100
parts polymer: Mechanical instability
0.0 (control) --------------------------- 0.58
0.3 ------------------------------------ 0.23
0.6 ------------------------------------ 0.18
1.2 ------------------------------------ 0.075

What is claimed is:
1. In a process for separating an unreacted monomer from latex selected from the group consisting of polychloroprene latex, synthetic latices of homopolymers of conjugated diolefins and synthetic latices of copolymers of conjugated diolefins and monoethylenically unsaturated monomers, the improvement comprising reducing prefloc formation by separating unreacted monomer from the latex in the presence in the latex of about 0.001–2.0 parts by weight for each 100 parts by weight of latex solids of at least one higher aliphatic alcohol containing only carbon, hydrogen and oxygen and having a carbon chain of about 14–25 inclusive carbon atoms, the higher aliphatic alcohol being dispersed in the latex prior to commencing separation of the unreacted monomer.

2. The process of claim 1, wherein the higher aliphatic alcohol comprises at least one alcohol having a carbon chain of 16–18 inclusive carbon atoms.

3. In a process for separating unreacted polymerizable material from latex selected from the group consisting of polychloroprene latex, synthetic latices of homopolymers of conjugated diolefins and synthetic latices of copolymers of conjugated diolefins and monoethylenically unsaturated monomers, the improvement comprising reducing prefloc formation by separating unreacted polymerizable material from the latex in the presence in the latex of about 0.005–0.5 part by weight for each 100 parts by weight of latex solids of at least one higher aliphatic alcohol containing only carbon, hydrogen and oxygen and having a carbon chain of about 14–25 inclusive carbon atoms, the higher aliphatic alcohol being dispersed in the latex prior to commencing separation of the unreacted polymerizable material.

4. The process of claim 3 wherein the higher aliphatic alcohol comprises at least one higher aliphatic alcohol having a carbon chain of 16–18 inclusive carbon atoms.

5. In a process for separating an unreacted monomer from styrene-butadiene copolymer latex, the improvement comprising reducing prefloc formation by separating unreacted monomer from the latex in the presence in the latex of about 0.001–2.0 parts by weight for each 100 parts by weight of latex solids of at least one higher aliphatic alcohol containing only carbon, hydrogen and oxygen and having a carbon chain of about 14–25 inclusive carbon atoms, the higher aliphatic alcohol being dispersed in the latex prior to commencing separation of the unreacted monomer.

6. The process of claim 5 wherein the higher aliphatic alcohol comprises at least one alcohol having a carbon chain of 16–18 inclusive carbon atoms.

7. In a process for separating an unreacted monomer from styrene-butadiene copolymer latex, the improvement comprising reducing prefloc formation by vaporizing unreacted monomer from the latex in the presence in the latex of about 0.005–0.5 part by weight for each 100 parts by weight of latex solids of at least one higher aliphatic alcohol containing only carbon, hydrogen and oxygen and having a carbon chain of about 14–25 inclusive carbon atoms, the higher aliphatic alcohol being dispersed in the latex prior to commencing vaporization of the unreacted monomer.

8. The process of claim 7 wherein the higher aliphatic alcohol comprises at least one alcohol selected from the group consisting of cetyl alcohol and stearyl alcohol.

9. In a process for separating 1,3-butadiene from latex of a copolymer of 1,3-butadiene and a monoethylenically unsaturated monomer, the improvement comprising reducing prefloc formation by separating 1,3-butadiene from the latex in the presence in the latex of about 0.001–2.0 parts by weight for each 100 parts by weight of latex solids of at least one higher aliphatic alcohol containing only carbon, hydrogen and oxygen and having a carbon chain of about 14–25 inclusive carbon atoms, the higher aliphatic alcohol being dispersed in the latex.

10. The process of claim 9 wherein the higher aliphatic alcohol comprises at least one alcohol having a carbon chain of 16–18 inclusive carbon atoms.

11. In a process for separating 1,3-butadiene from latex of a copolymer of 1,3-butadiene and a monoethylenically unsaturated monomer, the improvement comprising reducing prefloc formation by vaporizing 1,3-butadiene from the latex in the presence in the latex of about 0.005–0.5 part by weight for each 100 parts by weight of latex solids of at least one higher aliphatic alcohol containing only carbon, hydrogen and oxygen and having a carbon chain of about 14–25 inclusive carbon atoms, the higher aliphatic alcohol being dispersed in the latex.

12. The process of claim 11 wherein the higher aliphatic alcohol comprises at least one alcohol selected from the group consisting of cetyl alcohol and stearyl alcohol.

13. In a process for separating 1,3-butadiene from styrene-butadiene copolymer latex, the improvement comprising reducing prefloc formation by vaporizing 1,3-butadiene from the latex in the presence in the latex of about 0.001–2.0 parts by weight for each 100 parts by weight of latex solids of at least one higher aliphatic alcohol containing only carbon, hydrogen and oxygen and having a carbon chain of about 14–25 inclusive carbon atoms, the higher aliphatic alcohol being dispersed in the latex.

14. The process of claim 13 wherein the higher aliphatic alcohol comprises at least one alcohol having a carbon chain of 16–18 inclusive carbon atoms.

15. In a process for separating 1,3-butadiene from styrene-butadiene copolymer latex, the improvement comprising reducing prefloc formation by flashing 1,3-butadiene from the latex in the presence in the latex of about 0.005–0.5 part by weight for each 100 parts by weight of latex solids of at least one higher aliphatic alcohol containing only carbon, hydrogen and oxygen and having a carbon chain of about 14–25 inclusive carbon atoms, the higher aliphatic alcohol being dispersed in the latex.

16. The process of claim 15 wherein the higher aliphatic alcohol comprises at least one alcohol selected from the group consisting of cetyl alcohol and stearyl alcohol.

References Cited in the file of this patent

UNITED STATES PATENTS

| | | |
|---|---|---|
| 2,614,087 | Turnbull | Oct. 14, 1952 |
| 2,662,866 | Bristol | Dec. 15, 1953 |
| 2,702,285 | Bebb et al. | Feb. 15, 1955 |
| 2,805,210 | Stoner et al. | Sept. 3, 1957 |
| 2,863,843 | Scott et al. | Dec. 9, 1958 |
| 2,927,065 | Gerlicher et al. | Mar. 1, 1960 |

FOREIGN PATENTS

| | | |
|---|---|---|
| 444,375 | Great Britain | Mar. 19, 1936 |
| 745,927 | Great Britain | Mar. 7, 1956 |

OTHER REFERENCES

Munzel: "Chemical Abstracts," volume 42, January–March 1948, column 719.